US005476560A

United States Patent [19]

Jönsson

[11] Patent Number: 5,476,560
[45] Date of Patent: Dec. 19, 1995

[54] METHOD OF PRODUCING AN IMPROVED HULL

[76] Inventor: Sven Jönsson, Elvesta Säteri, S-145 90 Norsborg, Sweden

[21] Appl. No.: 344,620

[22] Filed: Nov. 17, 1994

Related U.S. Application Data

[63] Continuation of Ser. No. 730,791, filed as PCT/SE90/00065, Feb. 1, 1991, abandoned.

[30] Foreign Application Priority Data

Feb. 8, 1989 [SE] Sweden ................................ 8900437

[51] Int. Cl.⁶ ................................ B63B 9/00; B63B 9/06
[52] U.S. Cl. .......................... 156/71; 114/355; 114/357; 114/361; 156/94
[58] Field of Search ..................... 114/356, 357, 114/369, 355, 361, 67 R, 222; 156/94, 71, 285; 29/402.11; 428/319.9, 319.3

[56] References Cited

U.S. PATENT DOCUMENTS

| | | | |
|---|---|---|---|
| 3,160,549 | 12/1964 | Caldwell | 244/119 |
| 3,268,924 | 8/1966 | Dane | 114/356 |
| 3,467,569 | 9/1969 | Weber | 428/319.9 |
| 3,497,990 | 3/1970 | Jeffries | 114/222 |
| 3,607,595 | 9/1971 | Windecker | 156/71 |
| 3,680,516 | 8/1972 | Loverdos-Stelakatos | 114/67 R |
| 3,756,895 | 9/1973 | Bellamy | 156/94 |
| 3,761,334 | 9/1973 | Zondek | 156/71 |
| 3,802,976 | 4/1974 | McMahon | 156/71 |
| 4,035,546 | 7/1977 | Ruppert | 156/71 |
| 4,073,674 | 2/1978 | Hortel | 156/285 |
| 4,116,150 | 9/1978 | McCown | 114/74 A |
| 4,118,814 | 10/1978 | Holtom | 114/357 |
| 4,122,203 | 10/1978 | Stahl | 156/71 |
| 4,155,787 | 5/1979 | DeSadier | 156/71 |
| 4,187,796 | 2/1980 | Ess | 114/312 |
| 4,273,598 | 6/1981 | Bowditch | 156/94 |
| 4,365,580 | 12/1982 | Blount | 114/356 |
| 4,473,608 | 9/1984 | Grundmann | 156/71 |
| 4,483,267 | 11/1984 | Seemann | 114/357 |
| 4,850,297 | 7/1989 | Rogstad | 114/356 |
| 5,106,439 | 4/1992 | Wellings | 156/71 |

FOREIGN PATENT DOCUMENTS

| | | | |
|---|---|---|---|
| 2068336 | 8/1971 | France | 114/357 |
| 0231741 | 10/1987 | Japan | 428/319.9 |
| 0710862 | 1/1980 | U.S.S.R. | 156/71 |
| 0954640 | 4/1964 | United Kingdom . | |
| 1412972 | 11/1975 | United Kingdom | 156/71 |

OTHER PUBLICATIONS

"Process Would Use Foam to Alleviate Fatigue, Corrosion in Aging Aircraft", Aviation Week & Space Technology, Aug. 27, 1990.

Primary Examiner—Michael W. Ball
Assistant Examiner—Daniel J. Stemmer
Attorney, Agent, or Firm—Ronald J. Kubovcik

[57] ABSTRACT

The present invention relates to a method of producing an improved hull at new building of and renovating ships and boats having metal hulls for accomplishing high finish, good heat insulation and good acoustic attenuation, according to which sheets or mats of cellular plastic are glued on to the outside of the hull with the use of a glue giving an elastic or viscoelastic glue joint.

9 Claims, No Drawings

METHOD OF PRODUCING AN IMPROVED HULL

This application is a continuation of application Ser. No. 07/730,791, filed as PCT/SE90/00065, Feb. 1, 1990 now abandoned.

The present invention relates to a method of producing an improved hull at new building of and renovating of ships and boats with metal hulls for accomplishing high finish, good heat insulation and good acoustic attenuation.

In the present specification and claims "metal hull" is used in the meaning of hulls made of metal and metal alloys, such as steel and aluminium.

In today's vessels with metal hulls, the metal sheet lies outermost against the cold surroundings and therefore assumes this temperature. This leads to moisture in the warmer air inside the hull to condense against the sheet metal and condensed water will wet the inside insulation and will flow down beneath the floor plates. To this must be added that the ships of today contain much electronics, which necessitates climate control which because of the air circulation will result in further condensation underneath the floor plates. Because of this the heat insulation of the vessel will function poorly and rusting will take place on the inside of the hull and underneath the floor plates.

Efforts have been made to solve these problems by isolating the vessels from the inside, but because of regulations of material to be used inside boats and ships, you are limited to the use of fire proof materials such as mineral wool. The moisture passes through these materials and is condensed on the cold metal surface. The insulation will become moist and the environment will remain bad and further, no skeleton attenuation at all will be obtained.

Another difficult problem, esp. for marine force applications, is the acoustic attenuation of vessels with metallic hulls. According to one technique a material having viscoelastic properties is applied on the inside of the hull and according to another technique such a material is applied on the outside of the hull. The material might for example be a bitumen emulsion. These techniques will work quite well in warm waters, but as soon as the water temperature decreases, the acoustic attenuation will be reduced because of the hardening of the material, which thereby will lose it's ability of acoustic attenuation. The most part of the year the temperature of the Baltic sea will be +4° C. or below, at which temperature no acoustic attenuation will be obtained at all.

Another problem with metallic hull vessels, which has not found a satisfying solution either, is the difficulty of obtaining an acceptable surface finish because of the buckles and irregularities which always occur with metallic hull vessels. This is especially true for light built boats and ships made of aluminium. In the yacht industry, where very high demands are put on the finish of the hull the costs are very high for accomplishing the desired high finish. Further there are not any good solutions to the problem of isolating the hull.

Through e.g. US-A-4 365 580 it is previously known to produce a hull construction based on an inner box-shaped metallic hull with a layer of cellular plastic adhered to the hull, and an outer, hard surface layer outside said cellular plastic layer. The disclosed method comprises application of a hardenable plastic composition in a non-cured state on the outside of the hull. The composition is cured and thereafter adheres to the hull. A great disadvantage here is that the adhering surface is small, since cells directly abut the metal. In order to solve this problem rails are arranged on the hull, which function as anchoring for the cellular plastic. Again the adhering surface between the foamed plastic and the anchoring is small and already at small strains the cells will be crushed around the anchoring and then these do not fullfil any other function than stiffening the metallic hull. Already because of the different temperature coefficient of expansion for metal and cellular plastic, respectively, there is a risk that the cellular structure in the border zone is broken.

The object of the present invention is to provide a method with which the above disadvantages are eliminated and which results in a hull having good heat insulation properties and at the same time eliminates the condensation problems and provides good acoustic attenuation and which creates opportunities for obtaining high finish with reduced labour, lower increase of weight and greater strength.

This is achieved with the method according to the present invention, which is characterized in that sheets or mats of cellular plastic are glued to the outside of the hull with the aid of a glue giving an elastic or viscoelastic glue joint.

The use of a glue giving an elastic or viscoelastic glue joint between hull and cellular plastic layer creates a dilatation joint with the ability of absorbing shear forces. The cellular plastic layer itself has a certain ability of absorbing shear forces without being damaged or being afflicted negatively and with the method according to the invention the risk for damages because of e.g. large temperature variations and/or heavy strains are eliminated. In a heavy collision with an item, only a local injury occurs which does not afflict the surrounding hull portions and since the cellular plastic absorbs at least part of the energy in a shock the risk for an injury of the metallic hull is reduced considerably. Therefore it is also possible to use hulls made according to the invention for e.g. ice-going vessels.

According to one embodiment of the invention sheets or mats made from pressure-expanded cellular plastic with a uniform density of between 50 and 400 kg/m$^3$ are used, preferably PVC (polyvinyl chloride) cellular plastic. However, also other plastics complying with the demands of uniform density and mechanical strength might be used.

According to another embodiment of the invention, sheets having a thickness of 10–70 mm are applied.

According to another embodiment of the invention sheets or mats are glued in two or several layers onto the hull, whereby the density of the boards in the different layers might be the same or different.

According to a further embodiment of the invention the hard surface layer is created by application of a layer of reinforced plastic, after an optional surface treatment, on the outside of the glued-on cellular plastic layer.

According to another embodiment of the invention, in order to obtain a larger adhering surface, mats or sheets being embossed on the surface which is to be placed against the hull, are used.

According to another embodiment of the invention the mats or sheets are applied by stepwise vacuum-gluing in such a way that after the application of the sheet or mat material on the hull with the aid of glue, said sheet or mat is covered with a sheeting with overlap towards the free metallic surface, whereupon a sub-pressure is applied between the sheeting and the sheet-metal.

According to another embodiment of the invention the mats or sheets are perforated in order to facilitate the vacuum gluing.

It is also possible to use cellular plastic material in the form of sheets or mats, which is especially adapted for application on double curved surfaces, being cut in squares and wherein the squares of the material are connected to each other with the aid of a carrier layer. This type of material might be used on certain types of surfaces, esp. when the demands on the heat insulation are not so high.

According to the present invention one thus accomplishes on for example aluminium vessels a hull with all the advantages of an aluminium construction while at the same time all it's disadvantages are eliminated, such as poor insulation; that it is hard to work, if high finish is desired, since the material can not be heat straightened; that when the desired finish is accomplished with the aid of putty, much weight is added and a great part of the gain in using an aluminium hull is lost.

With the method according to the invention, in contrast to conventional technique a weak aluminium construction can be erected, which is part of a rigid sandwich construction. This gives the construction a strength which for example a pure plastic construction can not give, at least not with a reasonable thickness. In practice, the use of the method according to the invention leads to reducing the aluminium sheet metal thickness down to about 20% of the thickness normally used.

The construction made according to the invention has a very high constructive strength with a very low weight compared to known constructions. The insulation on the outside results in that all fire demands and demands on that the insulation must not be moisture absorbing are eliminated. A heat insulation of the hull is obtained and since the diffusion barrier lies on the right side the condensation problems are eliminated. The insulation of the bottom significantly reduces the energy consumption for maintaining the desired climate inside the hull. To this is added that no treatment of the inside of the hull is needed at all, whereby it's inside will be easy to inspect, easy to keep clean and all corrosion problems are eliminated.

The method according to the invention can be used on existing ships as well as when building new ships. The method is also suitable for arresting corrosive attack both on the inside and on the outside. It can be used also where the metal sheet is partly perforated because of corrosive attack. The method according to the invention might also be used for the insulation of the deck and deck housing.

The advantages of the construction according to the invention are illustrated more in detail below in connection with an example.

EXAMPLE

Calculations were made on a hull construction made according to the present invention and on a standard hull made of aluminium.

The aluminium hull made according to the invention comprises 4 mm Al sheet metal erected on 70 mm high aluminium frame ribs, on which is glued 25 mm PVC with a density of 75 kg/m$^3$, which in turn is covered with 3 mm glass fibre armoured plastic. Calculations were made for embodiments with and without an inner lining on the frame ribs, that is with and without an air pocket.
Assumptions
Total area A=300 m$^2$ (exposed area)
Under water area Au=100 m$^2$
Surrounding temp.=−10° C.−+40°C.
Inside temp. +20° C., $\Delta T_1$=20° C.; $\Delta T_2$=30° C.
Inside lining is mounted on the Al frame ribs. The total area of the Al frame ribs is estimated to 10% of A (exposed area).
Calc. of heat transmission coefficient
1. Sandwich alone Al-PVC-GAP
2. Sandwich+70 mm air
3. Sandwich+Al frame ribs
4. Scaled K-value (from 2 and 3)
5. Al-plate alone (standard hull)
Heat transfer coefficients chosen

| | |
|---|---|
| air/wall outside | $\alpha_y$ = 30 W/m$^2$ °C. |
| air/wall inside | $\alpha_i$ = 8 W/m$^2$ °C. |
| water/wall | $\alpha_y$ = 500 W/m$^2$ °C. |

$K_1$=1.02 W/m$^2$ ° C.
$K_2$=0.27 W/m$^2$ ° C.
$K_3$=1.02 W/m$^2$ ° C.
$K_4$=0.35 W/m$^2$ ° C. (assuming that 10% of inner wall surface is Al frame ribs)
The K-value obtained presumes non-moving air in the frame rib spaces. The column width (70 mm)+leaks result in that the true K value is reduced:
at small air movements in the space only heat transfer results in a reduction of the K value to $K_{eff}$=0.8 W/m$^2$ ° C.
The true K value will be somwhere between 0.35 and 0.8 and is chosen to $K_{real}$=0.6 W/m$^2$ ° C.
K5=7.7 W/m$^2$ ° C. (non-insulated Al sheet metal underneath the water surface)
Losses at temperature differences $T_1$=20° C. and $T_2$=30° C., constructive factor n=20%:
$Q_{1.1}$=1,2*1,02*300*20=7344 (W)
$Q_{1.2}$=1,2*1,02*300*30=11016 (W)
$Q_{4.1}$=1,2*0,35*300*20=2520 (W)
$Q_{4.2}$=1,2*0,35*300*30=3780 (W)
Assumed true loss:
$Q_{real.1}$=1,2*0,6*300*20=4320 (W)
$Q_{real.2}$=1,2*0,6*300*30=6480 (W)
Corresponding values for a standard hull made of Al sheet metal (100 m$^2$ underneath the water surface)
$Q_1$=7,7*100*20=15400 (w)
$Q_2$=7,7*100*30=23100 (w)
If insulation is present, and even if it is damp, a certain insulation effect is obtained, these values will be somewhat lower.
Dew point:
At 70% atmospheric relative humidity and an inner temperature of 20° C. the dew point $t_{dew}$≈14° C.
The temperature on internal aluminium sheet metal surface at:
outside temperature+4° C.=17° C.
outside temperature−10° C. =16° C.
The conclusion will thus be that also under extreme conditions the sheet metal temperature will lie over the dew point, whereby all condensing problems are eliminated, even under the floor plates.

The high sheet metal temperature implies at the same time that the viscoelastic material can be optimized for the prevailing sheet metal temperature, which means that maximum acoustic attenuation is obtained.

I claim:
1. A method of producing an improved hull for a marine vessel, comprising:
providing a marine vessel having an outer surface defined by a metal hull;
applying sheets or mats of cellular plastic material to the outer surface of the metal hull, wherein glue is provided between the hull and the sheets or mats to form an elastic or viscoelastic joint, the sheets or mats imparting insulating and acoustic attenuation properties such that a temperature on an inside surface of the metal hull at 70% relative humidity is above the dew point when a temperature on an outer side of the mats or sheets is between −10° C. and 40° C.

2. The method according to claim 1, wherein the sheets or mats comprise pressure expanded cellular plastic having a uniform density of between 50 and 400 kg/m$^3$.

3. The method according to claim 2, wherein the cellular plastic is polyvinyl chloride cellular plastic.

4. The method according to claim 1 or claim 2, wherein the applied sheets or mats have a thickness of 10–70 mm.

5. The method according to claim 1 or claim 2, wherein more than one layer of the sheets or mats is applied on the hull, whereby a density of the sheets or mats may be the same or different.

6. The method according to claim 2, wherein a layer of reinforced plastic is provided on the outside of the cellular plastic layer, after an optional surface treatment.

7. The method according to claim 1 or claim 2, wherein the sheets or mats are embossed to create a larger adhering surface.

8. The method according to claim 1 or claim 2, wherein the sheets or mats are applied stepwise on the hull, whereupon the sheets or mats are covered with a sheeting having an overlap towards a free metal surface of the hull, and whereupon a sub-pressure is applied between the sheeting and the metal hull.

9. The method according to claim 8, wherein the mats or sheets are perforated to facilitate gluing.

* * * * *

UNITED STATES PATENT AND TRADEMARK OFFICE
CERTIFICATE OF CORRECTION

PATENT NO. : 5,476,560
DATED : December 19, 1995
INVENTOR(S) : Sven JONSSON

It is certified that error appears in the above-indentified patent and that said Letters Patent is hereby corrected as shown below:

On the title page: Item

[63], change "Feb. 1, 1991" to --Feb. 1, 1990--.

Signed and Sealed this

Ninth Day of July, 1996

Attest:

BRUCE LEHMAN

*Attesting Officer*  *Commissioner of Patents and Trademarks*